United States Patent
Doyle et al.

(10) Patent No.: US 9,285,549 B2
(45) Date of Patent: Mar. 15, 2016

(54) OPTICAL FIBRE CONNECTOR

(75) Inventors: Patrick Doyle, Cork (IE); Thomas Moriarty, Cork (IE)

(73) Assignee: FIRECOMMS LIMITED, Cork (IE)

( * ) Notice: Subject to any disclaimer, the term of this patent is extended or adjusted under 35 U.S.C. 154(b) by 0 days.

(21) Appl. No.: 14/125,270

(22) PCT Filed: Jun. 14, 2012

(86) PCT No.: PCT/IE2012/000028
§ 371 (c)(1),
(2), (4) Date: Dec. 10, 2013

(87) PCT Pub. No.: WO2012/172532
PCT Pub. Date: Dec. 20, 2012

(65) Prior Publication Data
US 2014/0112624 A1    Apr. 24, 2014

(30) Foreign Application Priority Data
Jun. 16, 2011 (IE) .................................. 2011/0278

(51) Int. Cl.
*G02B 6/42* (2006.01)
*G02B 6/38* (2006.01)

(52) U.S. Cl.
CPC ............ *G02B 6/3858* (2013.01); *G02B 6/4292* (2013.01); *G02B 6/4277* (2013.01)

(58) Field of Classification Search
None
See application file for complete search history.

(56) References Cited

U.S. PATENT DOCUMENTS

| 4,030,809 A | * | 6/1977 | Onishi et al. ................... 385/71 |
| 4,181,401 A |   | 1/1980 | Jensen |
| 4,327,964 A | * | 5/1982 | Haesly et al. .................. 385/78 |
| 4,711,519 A | * | 12/1987 | Smulders .................... 385/137 |
| 5,028,113 A | * | 7/1991 | Benkan et al. .................. 385/16 |
| 5,138,681 A | * | 8/1992 | Larson et al. ................... 385/95 |
| 5,159,653 A | * | 10/1992 | Carpenter et al. ............. 385/95 |
| 5,313,546 A | * | 5/1994 | Toffetti ........................ 385/135 |
| 5,341,446 A | * | 8/1994 | Shibata .......................... 385/78 |
| 5,742,719 A | * | 4/1998 | Birnbaum ...................... 385/70 |

(Continued)

FOREIGN PATENT DOCUMENTS

| EP | 1193402 A1 | 4/2002 |
| JP | 7-301733 A | * 11/1995 | ............... G02B 6/42 |
| WO | 01/31379 A1 | 5/2001 |

OTHER PUBLICATIONS

International Search Report; PCT/IE2012/000028; Jan. 9, 2013.

(Continued)

*Primary Examiner* — Mike Stahl
(74) *Attorney, Agent, or Firm* — Studebaker & Brackett PC

(57) ABSTRACT

A connector includes a main body, and a pair of sockets. Each socket includes a pair of opposed resilient walls in the overall configuration of a split tube. The connector also includes a transversely sliding clamp with two tapered slots, located so that one of the sockets passes through each slot. After fiber terminations are pushed into the sockets through the clamp slots, the clamp is slid in a plane across the socket axes so that the narrower ends of the slots engage the opposed split tube resilient walls of each socket. This squeezes each socket so that the opposed split tube resilient walls press against the associated fiber termination and retains it in place. The sockets may have guide slots for guiding clamp movement. The clamp moves in a translational movement, but in another example the clamp rotates in the lateral plane to squeeze the sockets.

24 Claims, 8 Drawing Sheets

(56) References Cited

U.S. PATENT DOCUMENTS

| | | |
|---|---|---|
| 6,431,763 B1 | 8/2002 | Sherman et al. |
| 7,505,654 B2 * | 3/2009 | Demissy et al. ............... 385/52 |
| 7,597,485 B2 | 10/2009 | Moriarty et al. |
| 7,905,665 B2 | 3/2011 | Moriarty et al. |
| 8,506,179 B2 * | 8/2013 | Takeuchi et al. ............... 385/99 |
| 2001/0002220 A1 * | 5/2001 | Throckmorton et al. ....... 385/66 |
| 2002/0040953 A1 | 4/2002 | Linnenbuerger |
| 2005/0063645 A1 * | 3/2005 | Carpenter et al. ............. 385/70 |

OTHER PUBLICATIONS

International preliminary report on patentability; PCT/IE2012/000028; Dec. 17, 2013.

* cited by examiner

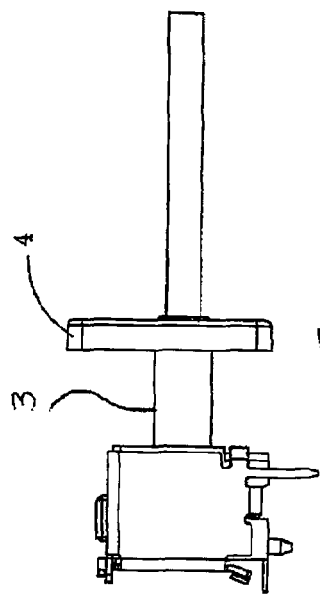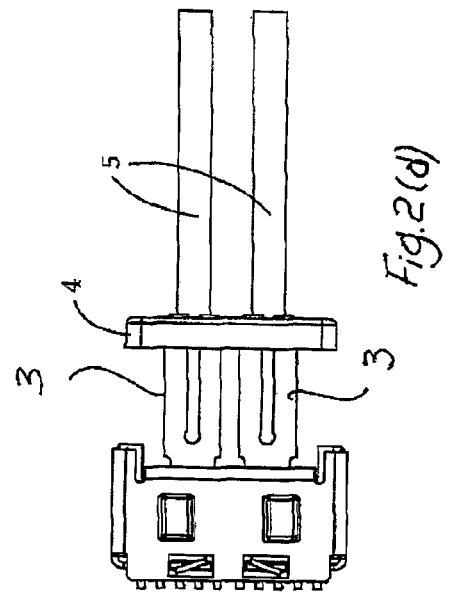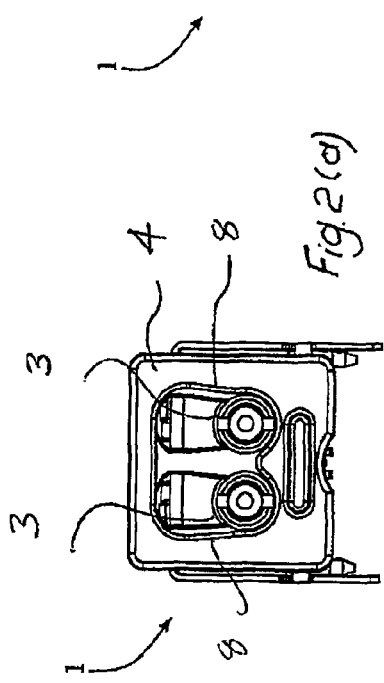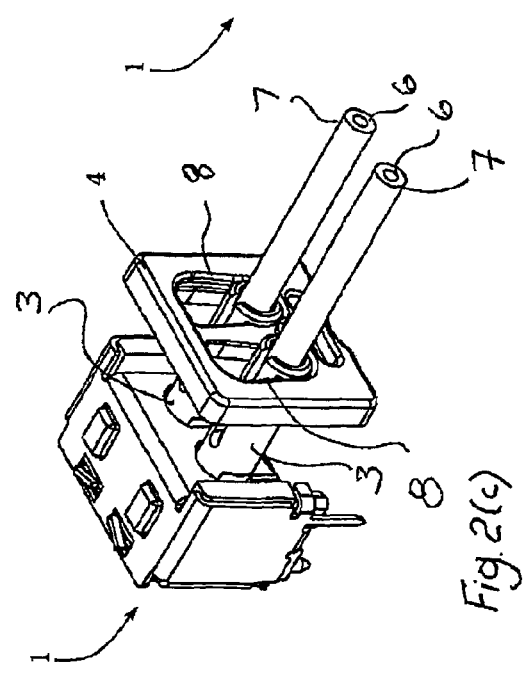

OPTICAL FIBRE CONNECTOR

FIELD OF THE INVENTION

The invention relates to a connector for receiving an optical fibre and retaining it in engagement with an optical element or another fibre.

PRIOR ART DISCUSSION

At each end of the optical fibre, a plug is usually fitted, and this plug is designed to mate with a connector. The connector is designed to hold the end of the fibre at the correct position in front of an optical element, so that light can pass from one to the other. The optical element may be a light source or detector, an electro-optical converter, or for example another light guide.

It is known to provide a connector in which the optical fibre cable may be inserted directly into the connector without the necessity to fit a plug to the end of the cable. In some such systems the fibre may be retained in the connector by the operation of a mechanism such as a screw or clamp, which must be released again to remove the fibre; the necessity to operate the mechanism makes the use of such connectors awkward, especially for people not familiar with such connectors. In other arrangements such as that of U.S. Pat. No. 6,431,763 the fibre is retained by friction or by a clip with a sharp edge that engages in the jacket of the fibre. Such systems are simpler to use, but have a number of disadvantages. It is difficult, or a tool is required, to remove the optical fibre cable if it is required to disconnect it. As the jacket of the fibre is somewhat elastic, the fibre will tend to move back a little after the insertion force is released, so leaving an undesirable gap between the end of the fibre and the optical element. Also, if any load comes on the fibre in a direction to withdraw it from the connector, it is likely to move out to some extent, until sufficient friction force is accumulated, or until the clip is sufficiently engaged in the jacket, to provide a retaining force.

A connector described in U.S. Pat. No. 7,597,485 and U.S. Pat. No. 7,905,665 overcomes the above problems, clamping the cable between the two sides of a split tube, but the front of this connector is somewhat bulky, requiring a significant hole in the housing of the equipment into which it is incorporated, and projecting some distance outside the equipment. If a number of these connectors are mounted close together in an array, it can be difficult to get a grip on the clamp of an individual connector to open it.

The invention is directed towards providing an improved connector.

SUMMARY OF THE INVENTION

According to the invention, there is provided an optical connector comprising a body, at least one socket to receive a fibre termination, and a clamp arranged to move in a lateral direction across a socket axis to retain a fibre termination in position in the socket, wherein the socket includes at least one resilient wall and the clamp is adapted to press the resilient wall against a fibre termination in the socket.

In one embodiment, there are at least two resilient walls and the clamp is adapted to press all of the resilient walls against a fibre termination.

In one embodiment, the clamp is arranged to move freely with respect to the connector body.

In one embodiment, the clamp is adapted to squeeze opposed sides of the socket.

In one embodiment, the clamp comprises a slot through which the socket extends, one end of the slot being narrower than the other end, so that sliding movement of the clamp squeezes the socket. Preferably, the slots are tapered for gradual change from wide to narrow.

In one embodiment, the clamp is adapted to move in a direction generally perpendicular to the socket axis.

In one embodiment, the socket has one or more sharp ridges or points on an inner surface for engaging a fibre termination.

In one embodiment, the socket has a material with a high co-efficient of friction, for gripping the outside of the fibre termination.

In one embodiment, the socket includes guide features for movement of the clamp. Preferably, the socket comprises grooves engaged by ridges of the clamp. In one embodiment, there are grooves on two opposed resilient walls of each socket.

In one embodiment, the socket comprises a leading tapered surface to guide axial movement of the clamp to engage the sockets. Preferably, the socket resilient wall grooves and the tapered surface are arranged for snap-fitting engagement of the clamp onto the socket.

In one embodiment, the clamp is joined to the remainder of the connector by one or more flexible links. In one embodiment, the clamp comprises a shutter arranged to cover the end of the socket in one position.

In one embodiment, the clamp comprises one or more holes, recesses, or projections to facilitate its being moved by the use of a tool such as a screwdriver or a ball point pen.

In one embodiment, the connector comprises a metallic element which provides electrical shielding for the optical element.

In one embodiment, the clamp is arranged to rotate in a lateral plane to press against the socket. In one embodiment, there are two or more sockets, and the clamp is arranged to rotate about one socket. In one embodiment, the socket is wider in one dimension than in another, and the clamp is arranged to close the socket when engaging the socket where it has a larger width dimension. Preferably, the socket includes features to retain the clamp to guide its rotation. In one embodiment, the socket and the clamp comprise a latch for retention of a clamp closed position. In one embodiment, the latch comprises a spring on the socket and a receiver on the clamp.

DETAILED DESCRIPTION OF THE INVENTION

Brief Description of the Drawings

The invention will be more clearly understood from the following description of some embodiments thereof, given by way of example only with reference to the accompanying drawings in which:

FIGS. 2(a) to 2(d) are front, side, perspective and top views respectively of the connector with the slide clamp in the locked position;

DESCRIPTION OF THE EMBODIMENTS

Figure 1A:
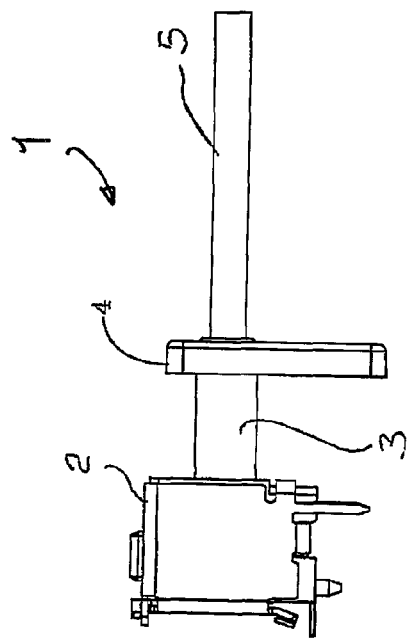
FIGS. 1(a) to 1(d) are front, side, perspective and top views respectively of a connector according to the invention with a slide clamp in the open position.
Figure 1B:
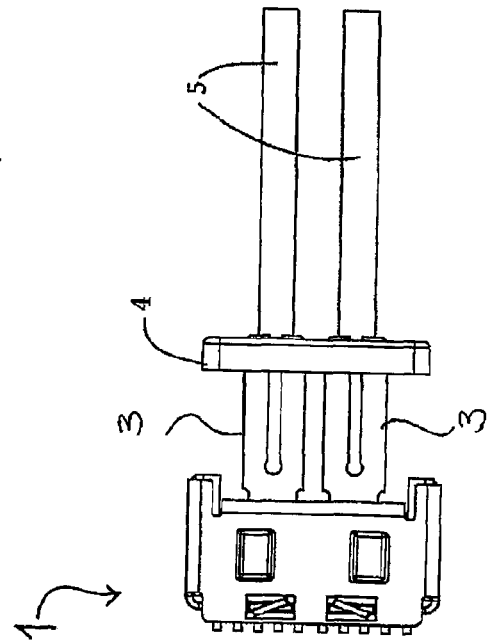
Figure 1C:
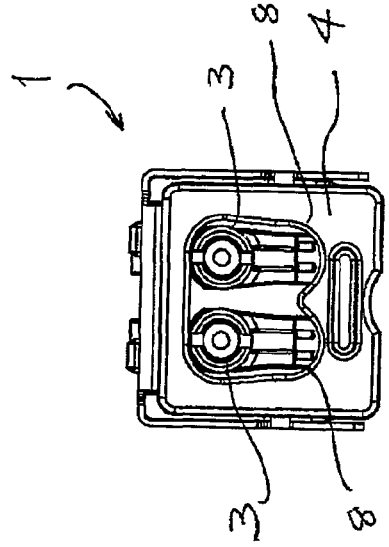
Figure 1D:
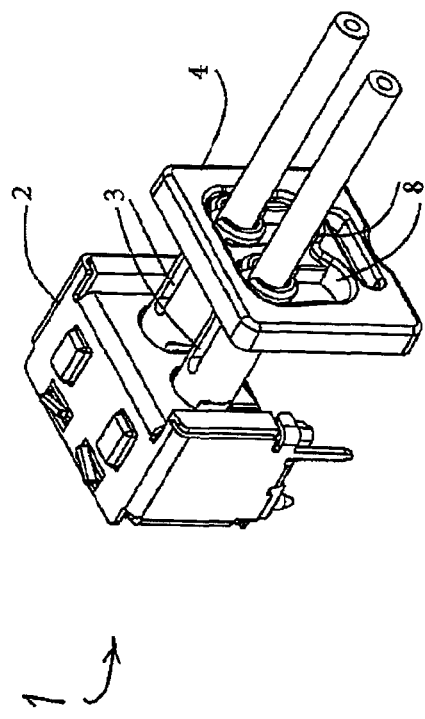

Referring to FIGS. 1 and 2, a connector 1 is illustrated, comprising a main body 2, and a pair of sockets 3. Each socket 3 comprises a pair of opposed resilient walls in the overall configuration of a split tube. They have dimensions so that a fibre termination is a friction fit when the split tube resilient walls are relaxed, but the walls press against the fibre termination when they are pressed together.

The main body 2 of the connector 1 includes a housing moulded as a single component with the sockets 3 and providing a location for electro-optical components of which the lenses are held in alignment with the axes of the sockets 3, so that optical cables inserted into the sockets 3 are guided by passages in the housing into alignment with the lenses of the electro-optical components. Most of the assembly comprising the housing 2 and the electro-optical components is surrounded by a metal cover which holds the components together and provides electrical screening.

The connector 1 comprises a transversely sliding clamp 4. Optical cables 5 have been inserted into each of the sockets 3. It can be seen that each optical cable 5 comprises an optical fibre 6 and an outer jacket 7. The outer jacket 7 is gripped by the socket resilient walls. The sliding clamp 4 includes two tapered slots 8, located so that one of the sockets 3 passes through each slot 8.

FIGS. 1(*a*) to 1(*d*) show the connector with the sliding clamp 4 in the open position, i.e. the clamp is in a position such that the wider end of each tapered slot 8 is located over the corresponding sockets 3. In this position the sides of each tapered slot 8 may exert some pressure on the sides of the corresponding split tubes 3, so that the sliding clamp 4 is retained on the socket split tubes, but the split socket tubes 3 remain sufficiently far apart to allow the easy insertion or removal of the optical cables.

FIGS. 2(*a*) to 2(*d*) show the connector with the sliding clamp 4 in the closed position, i.e. the clamp 4 is in a position such that the narrower end of each tapered slot 8 is gripping the corresponding socket 3, squeezing the split tube resilient walls 3 together so as to grip the optical cable. This position has been achieved by merely pushing the clamp 4 in a direction lateral to the socket 3 axes.

The socket walls may have one or more sharp ridges or points on an inner surface for engaging the outside of the fibre termination. Also, it may have a material with a high coefficient of friction, for gripping the outside of the optical cable or optical fibre.

The clamp 4 is retained in position on the sockets 3 by grooves on the outer surface of the sockets 3. The sockets 3 have features so that the clamp can be pushed into position on the split tubes 3, for example after the remainder of the connector has been mounted in equipment and the tubes passed through holes in the housing of the equipment.

Figure 3:
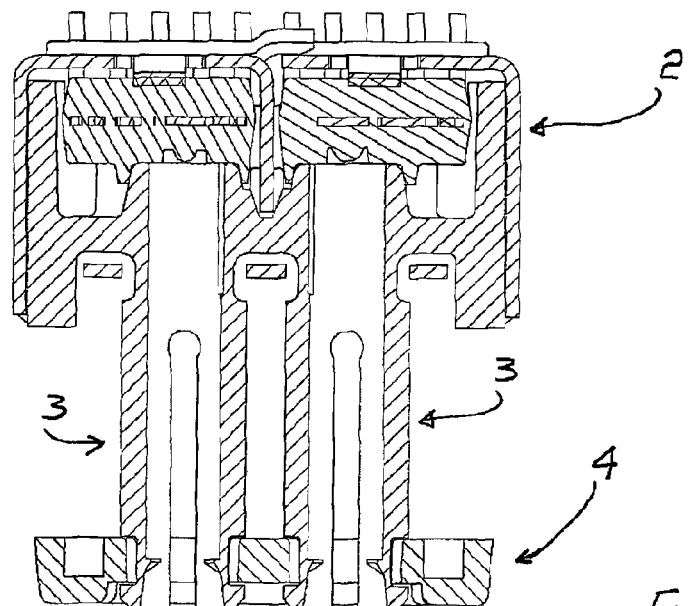
FIG. 3 is a cross-sectional view showing how the clamp engages the sockets.
Figure 4:
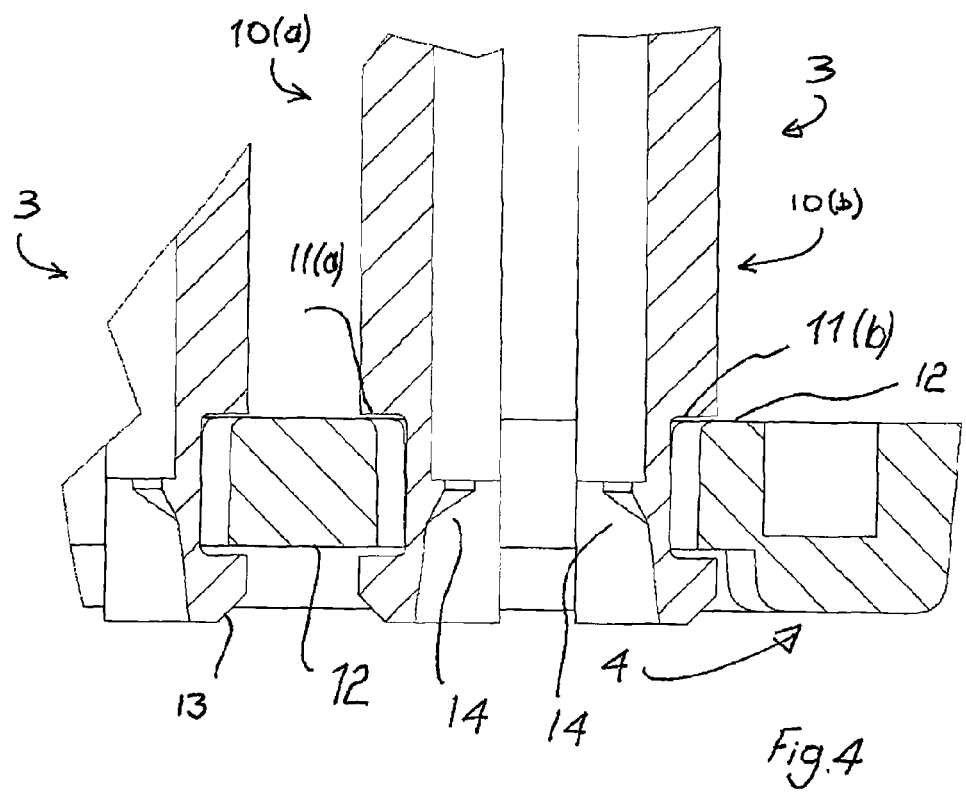
FIG. 4 is an enlarged view showing more detail.

Referring to FIGS. 3 and 4 each socket 3 comprises an inner resilient wall 10(*a*) and an outer resilient wall 10(*b*). The walls have grooves 11(*a*) and 11(*b*) respectively which are engaged by a rim 12 of the edge of the tapered hole 8. There is additionally a ramp 13 on each resilient wall to guide movement of the clamp 4 as it is being pushed axially onto the sockets 3, until it snaps fit into position. This arrangement of rim and slots ensures that the sockets are engaged at the optimum position for pressing the resilient walls. It allows a smooth lateral movement of the clamp, and it retains the clamp in position on the sockets.

FIGS. 3 and 4 also show teeth 14 on the inside surfaces of the resilient walls, for improved gripping of a fibre termination.

The clamp may be moulded as a single piece with the housing, being joined to the remainder of the connector by one or more flexible links. The clamp may have one or more holes, recesses or projections to facilitate its being moved by hand or by the use of a tool such as a screwdriver or a ball point pen.

The connector main body 2 may have a metallic element which provides electrical shielding for the optical element.

It will be appreciated that the optical element in the connector main body may be a light source or detector or a second optical fibre. In the case where the optical element is another optical cable, this may be held in position by a second set of sockets and sliding clamp. In this case it may be appropriate to have a barrier in the passage, such as an area where the diameter is reduced or a transparent disc or light guide is placed to limit the movement of the first fibre inserted.

Figure 5A:
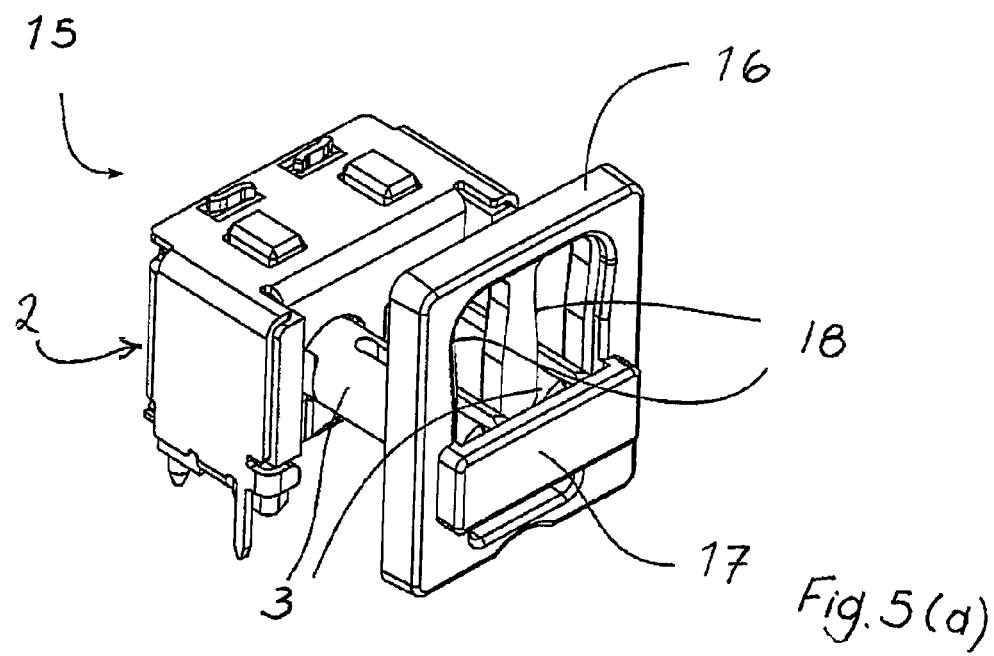
FIGS. 5(a), 5(b) and 5(c) show a connector of another embodiment, having a shutter to close off the sockets when not in use.
Figure 5B:
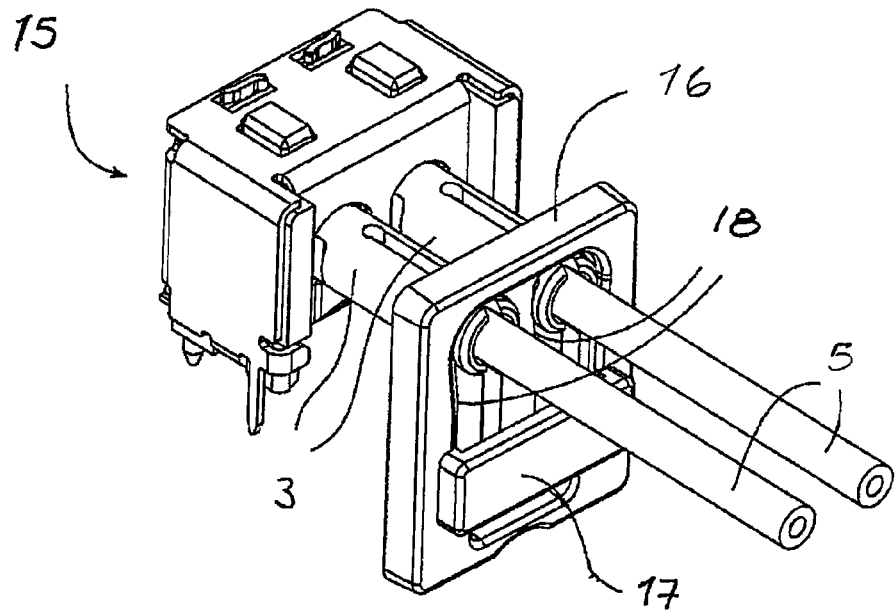
Figure 5C:
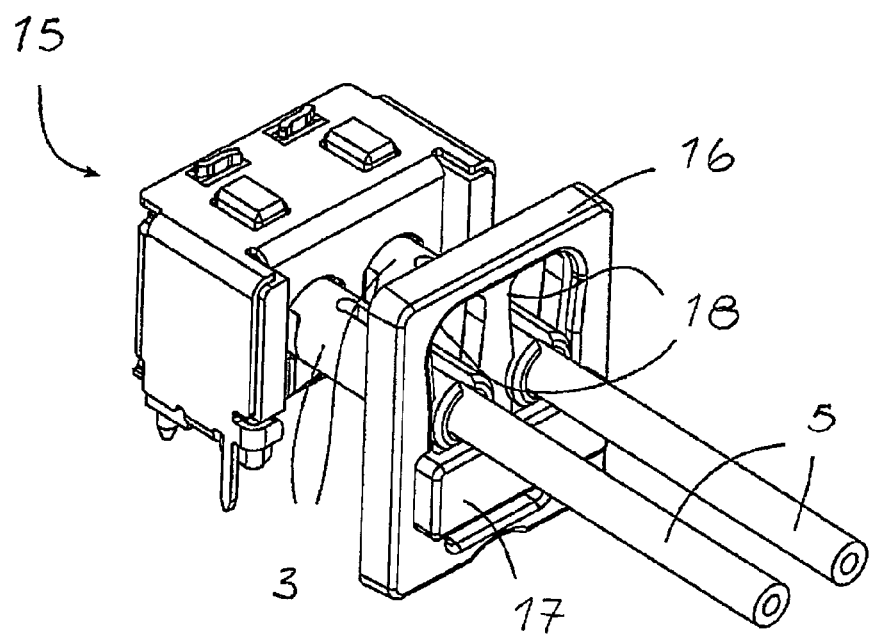

Referring to FIGS. 5(*a*) to 5(*c*), in another embodiment a connector 15 also has a main body 2, and a pair of split tube sockets 3. These are similar to those of FIGS. 1 and 2. However, in this case a sliding clamp 16 has a shutter 17 for closing off the ends of the sockets 3 when not in use. The shutter 17 is located across the bottom ends of tapered slots 18. The three modes or positions are:

FIG. 5(*a*): not in use, sockets 3 closed off by the shutter 17;

FIG. 5(*b*): optical fibres 5 being inserted into the sockets 3, which are open because they protrude through the wide parts of the tapered slots 18; and FIG. 5(*c*): the clamp 16 has been pushed up so that the slot 18 edges press the sockets 3 to close them.

The shutter 17 provides the major benefit of preventing contamination of the inside of the housing at the inner ends of the sockets.

However, in some circumstances it may be advantageous that the clamp move with a circular motion while remaining in a plane perpendicular to the axis of the fibre, and have one or more tapered slots formed between sides which are segments of helixes. Referring to FIGS. 6 to 9 an alternative connector 20 has a main body 2, but in this case there is a rotating clamp 21 which has a clamping action upon rotation about one of the sockets, namely the socket 22(*a*). The sockets 22 also have a split tube configuration and they also have slots to accommodate and retain the rotatable clamp 21.

In this case the clamp movement is also across the socket axis, but is rotational rather than translational.

The sockets 22 have flat-bottomed slots 23 on the sides of the split tubes for holding the clamp 21 on the tubes when in the open position. There are four of these, two on each split tube resilient wall diametrically opposite the tube axis and at 30° to the vertical plane. They also align the clamp 21 with flat bottomed slots 24 on the sides of the resilient walls. These are shallower than the slots 23 and cause the two socket resilient walls to deflect towards the centres when the clamp 21 is rotated into the clamping position. There are four of these, two on each tube resilient wall diametrically opposite the tube axis and parallel to the vertical plane.

Figure 6:
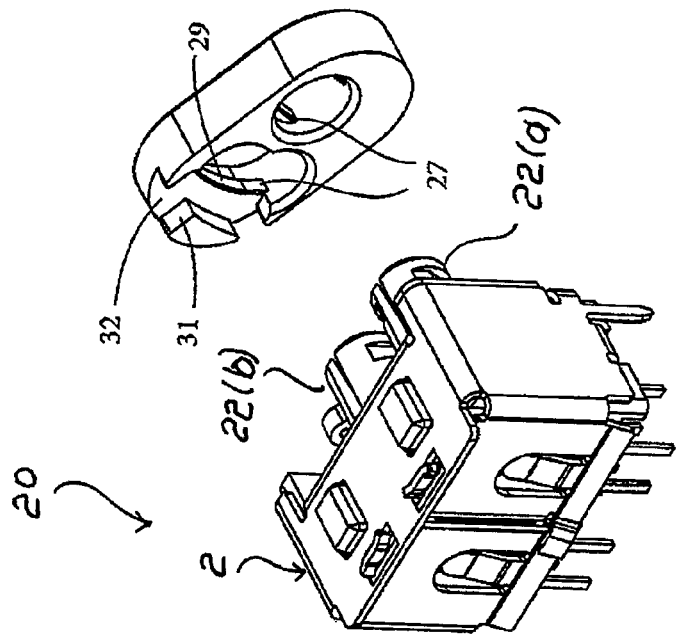
FIGS. 6 and 7 show perspective views of a connector with a rotary clamp.
Figure 7:
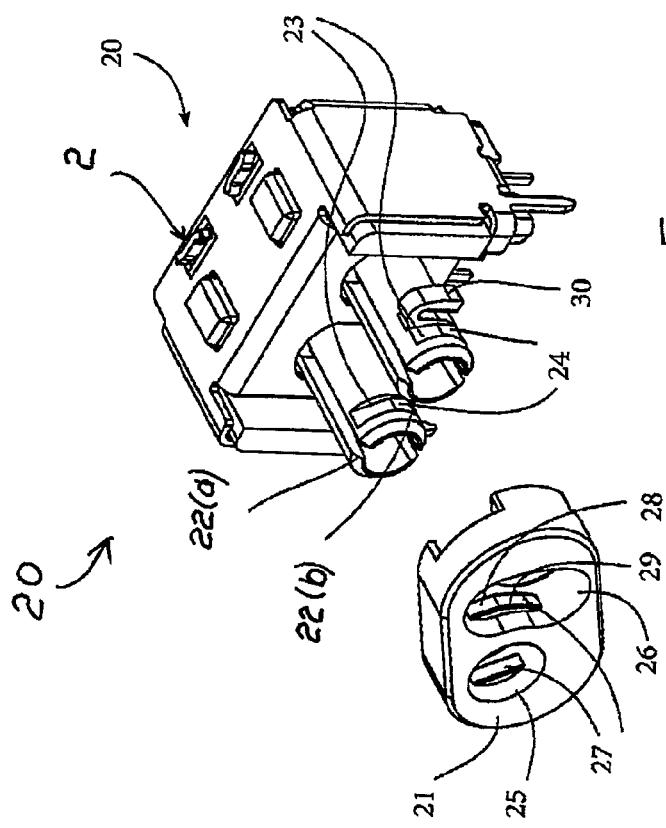
Figure 8:
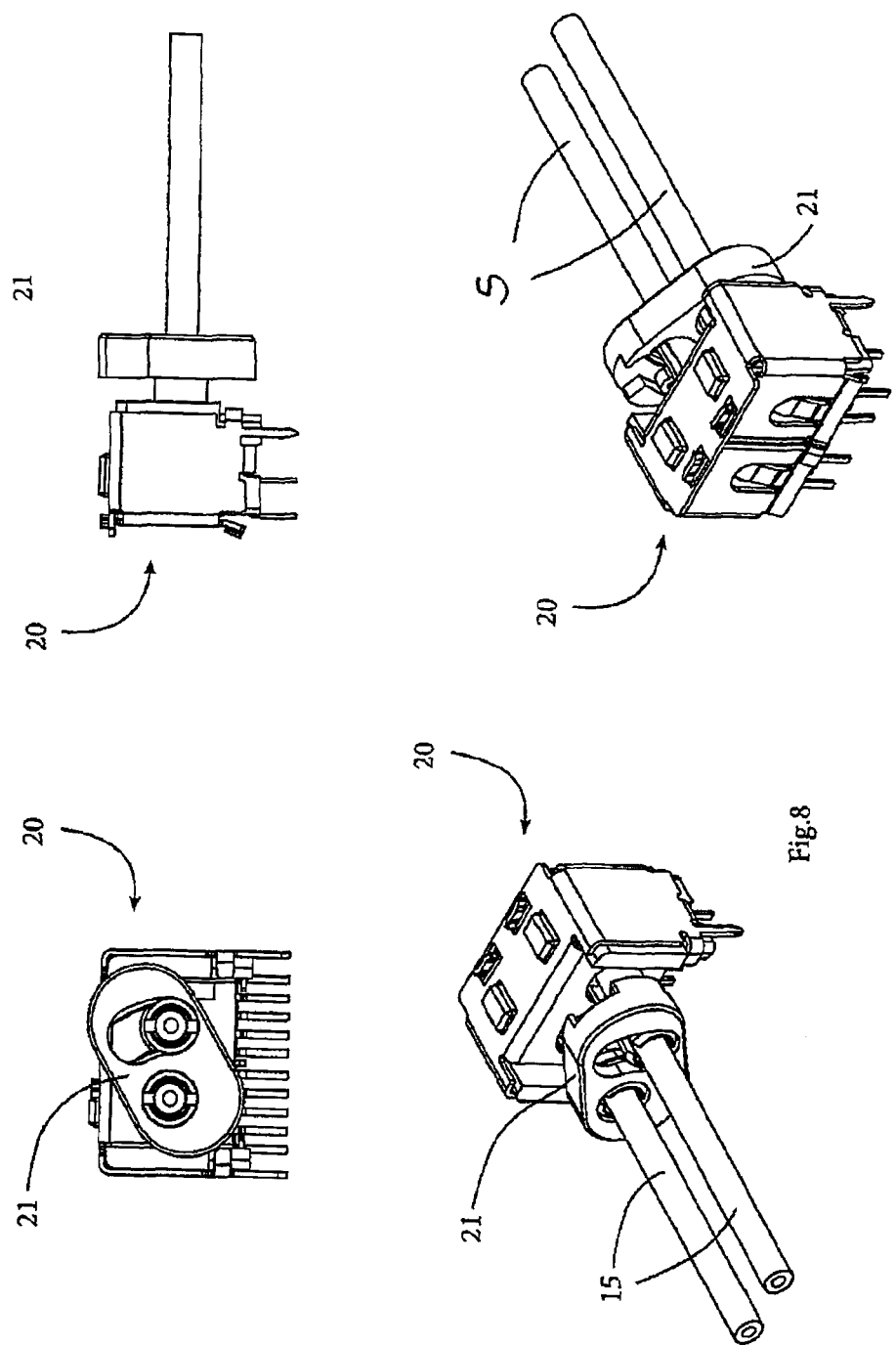
FIG. 8 shows front, side and perspective views with a rotary clamp in the open position.
Figure 9:
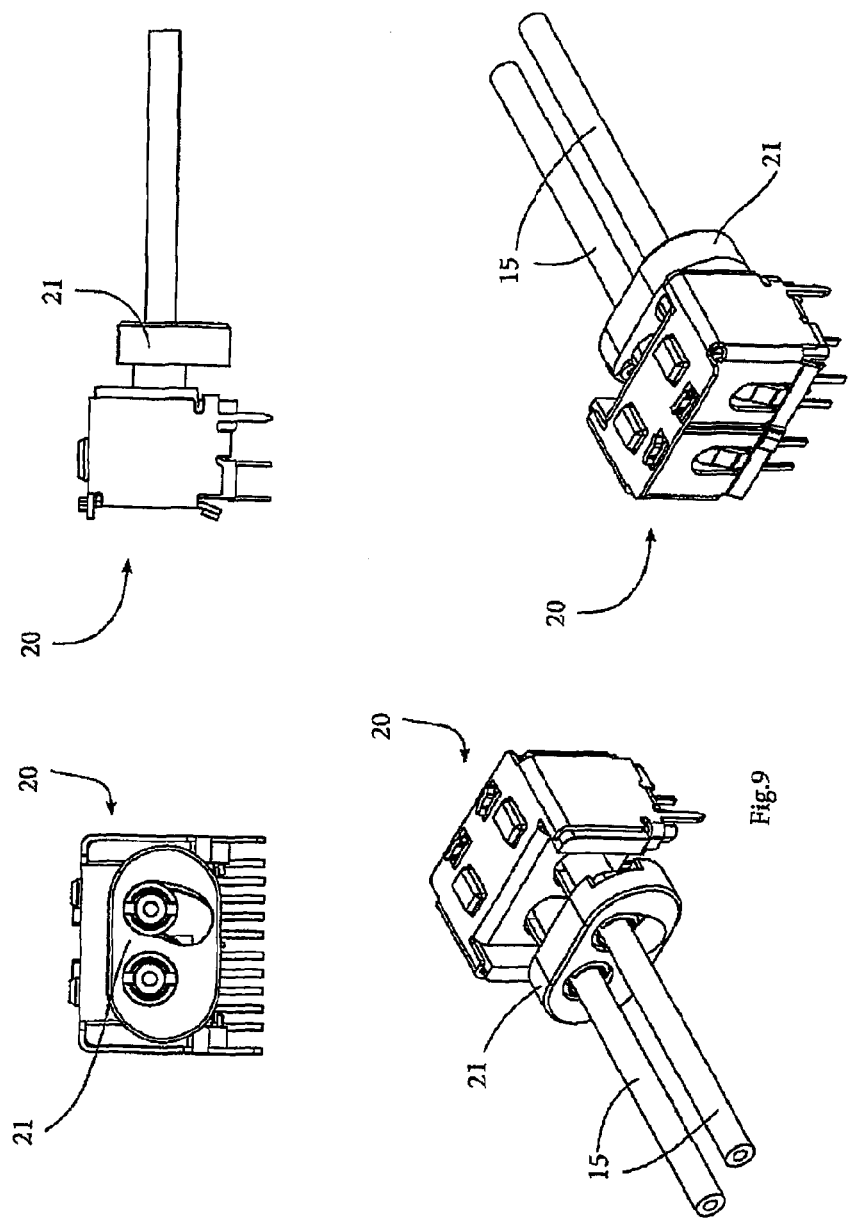
FIG. 9 shows front, side and perspective views of a connector with a rotary clamp in the locked position.

There is a circular opening 25 in the clamp 21, through which the left hand socket 22(*a*) is inserted, as viewed in FIG. 6. There is also an arc shaped opening 26 in the clamp, through which the right hand socket 22(*b*) of the housing is inserted. There are ribs 27 within the openings on the clamp which clip into the slots 23 to hold the clamp 21 on the sockets 22 when in the open position. Ribs 28 on the inside of the arc-shaped openings are in positions which correspond to the vertical slots on the right hand socket 22(b) when the clamp 21 is in the closed position. A rib 29 acts as a transition surface between the ribs 27 and 28, within the arc shaped opening in the clamp. Item 30 is a flexible clip which is compressed by the clamp 21 during the rotational movement of the clamp 21 and is released from its compressed condition when the clamp is fully closed. There is a surface 31 over which the clip 30 becomes positioned when the clamp is rotated into the closed position. The clamp 21 is prevented from rotation to the open position due to vibration or other movement due to the overlapping of the clip 30 over this surface, the clip and surface together acting as a latch. An opening 32 in the side of the clamp 21 allows a tool to be inserted against the clip 30 to compress it, and thereby allow the clamp 21 to be rotated to the opening position to release the fibres.

It will be appreciated that this is a very simple and effective arrangement. The clamp 21 is retained ready for use on the sockets. Closing is achieved by merely rotating it through about 30° so that the clamp's ribs engage the shallower grooves 24 so that the socket walls are compressed. The clip and surface 31 provide a very effective latch to prevent movement due to vibration for example.

In the above embodiment, the clamp rotates about a socket, but it may alternatively rotate about a pivot joint which is separate from the sockets.

In another embodiment the optical device is itself an assembly, as for example a combination of a light source, a light detector, and a light guide, which serves to guide the light from the light source to the inserted optical fibre, and guide the light coming from the fibre to the detector.

The connectors described above are arranged to take two optical cables, but connectors according to the invention may be constructed to take a single cable or to take three or more optical cables, coupling each to an appropriate optical element.

The connectors described above are constructed to hold an optical cable comprising a jacket over an optical fibre, so that it is simply required to cut the cable to length, ensure a good optical finish on the end of the optical fibre and insert it into the connector. It will be appreciated that connectors according to the invention may be constructed to grip the optical fibre directly. Some cables have more complex construction, for example the optical fibre may have an inner jacket and one or more such jacketed fibres may, in turn, be enclosed in an outer jacket. In this case a connector could be constructed according to the invention to grip the inner jacket after the outer jacket has been removed from the end portion of the cable.

In the connector as illustrated, the clamp moves in a straight line between the open and closed positions, and the tapered slot(s) are each symmetrical about a straight line axis. Also, in other embodiments there may be only one socket or more than two.

The invention claimed is:

1. An optical connector comprising
a body,
at least one socket to receive a fibre termination, and
a clamp arranged to move in a lateral direction across a socket axis to retain a fibre termination in position in the socket,
wherein the socket includes a split tube configuration having at least two resilient walls and the clamp is adapted to press the resilient walls against a fibre termination in the socket, wherein:
said resilient walls include at least two opposed resilient walls;
the clamp is adapted to press said opposed resilient walls towards each other, and
the clamp includes a slot through which the socket extends, one part of the slot being narrower than the other part, so that sliding movement of the clamp squeezes the socket.

2. The optical connector as claimed in claim 1, wherein the clamp is arranged to move freely with respect to the connector body.

3. The optical connector as claimed in claim 1, wherein the slot is tapered for gradual change from wide to narrow.

4. The optical connector as claimed in claim 1, wherein the clamp is adapted to move in a direction generally perpendicular to the socket axis.

5. The optical connector as claimed in claim 1, wherein the socket has one or more sharp ridges or points on an inner surface for engaging a fibre termination.

6. The optical connector as claimed in claim 1, wherein the socket has a material with a high co-efficient of friction, for gripping the outside of the fibre termination.

7. The optical connector as claimed in claim 1, wherein the socket includes guide features for movement of the clamp.

8. The optical connector as claimed in claim 1, wherein the socket includes guide features for movement of the clamp; and wherein the guide features include grooves engaged by ridges of the clamp.

9. The optical connector as claimed in claim 1, wherein the socket includes guide features for movement of the clamp; and wherein the guide features include grooves engaged by ridges of the clamp; and wherein there are grooves on two opposed resilient walls of the socket.

10. The optical connector as claimed in claim 1, wherein the socket includes a leading tapered surface to guide axial movement of the clamp to engage the socket.

11. The optical connector as claimed in claim 1, wherein the socket includes a leading tapered surface to guide axial movement of the clamp to engage the socket; and wherein the socket resilient walls include grooves, and said grooves and the tapered surface are arranged for snap-fitting engagement of the clamp onto the socket.

12. The optical connector as claimed in claim 1, wherein the clamp is joined to the remainder of the connector by one or more flexible links.

13. The optical connector as claimed in claim 1, wherein the clamp includes a shutter arranged to cover the socket in one position.

14. The optical connector as claimed in claim 1, wherein the clamp includes one or more holes, recesses, or projections to facilitate its being moved by the use of a tool.

15. The optical connector as claimed in claim 1, wherein the connector includes an optical element and a metallic element which provides electrical shielding for the optical element.

16. The optical connector as claimed in claim 1, wherein the clamp is arranged to rotate in a lateral plane to press against the socket.

17. The optical connector as claimed in claim 1, wherein the clamp is arranged to rotate in a lateral plane to press against the socket; and wherein there are two or more sockets, and the clamp is arranged to rotate about one socket.

18. The optical connector as claimed in claim 1, wherein the clamp is arranged to rotate in a lateral plane to press against the socket; and wherein there are two or more sockets, and the clamp is arranged to rotate about a first socket; and wherein the first socket is wider in one dimension than in another, and the clamp is arranged to close the first socket when engaging the first socket where it has a larger width dimension.

19. The optical connector as claimed in claim 1, wherein the clamp is arranged to rotate in a lateral plane to press against the socket; and wherein the socket includes features to retain the clamp to guide its rotation.

20. The optical connector as claimed in claim 1, wherein the clamp is arranged to rotate in a lateral plane to press against the socket; and wherein the socket and the clamp include a latch for retention of a clamp closed position.

21. The optical connector as claimed in claim 1, wherein the clamp is arranged to rotate in a lateral plane to press against the socket; and wherein the socket and the clamp include a latch for retention of a clamp closed position; and
wherein the latch comprises a spring on the socket and a receiver on the clamp.

22. An optical connector comprising
a body,
at least one socket to receive a fibre termination, and
a clamp arranged to move in a lateral direction across a socket axis to retain a fibre termination in position in the socket,
wherein the socket includes at least one resilient wall and the clamp is adapted to press the resilient wall against a fibre termination in the socket, wherein:
the clamp is adapted to squeeze opposed sides of the socket, and
the clamp includes a slot through which the socket extends, one part of the slot being narrower than the other part, so that sliding movement of the clamp squeezes the socket; and
wherein the socket has one or more sharp ridges or points on an inner surface for engaging a fibre termination.

23. An optical connector comprising
a body,
at least one socket to receive a fibre termination, and
a clamp arranged to move in a lateral direction across a socket axis to retain a fibre termination in position in the socket,
wherein the socket includes at least one resilient wall and the clamp is adapted to press the resilient wall against a fibre termination in the socket, wherein:
the clamp is adapted to squeeze opposed sides of the socket, and
the clamp includes a slot through which the socket extends, one part of the slot being narrower than the other part, so that sliding movement of the clamp squeezes the socket, and
wherein the socket includes guide features for movement of the clamp;
said guide features including grooves engaged by ridges of the clamp.

24. An optical connector comprising
a body,
at least one socket to receive a fibre termination, and
a clamp arranged to move in a lateral direction across a socket axis to retain a fibre termination in position in the socket,
wherein the socket includes at least one resilient wall and the clamp is adapted to press the resilient wall against a fibre termination in the socket, wherein:
the clamp is adapted to squeeze opposed sides of the socket, and
the clamp includes a slot through which the socket extends, one part of the slot being narrower than the other part, so that sliding movement of the clamp squeezes the socket,
wherein the clamp is arranged to rotate in a lateral plane to press against the socket; and
wherein there are two or more sockets, and the clamp is arranged to rotate about one socket.

\* \* \* \* \*